United States Patent [19]
Brown et al.

[11] 4,394,289
[45] Jul. 19, 1983

[54] CONTINUOUS FOAM GENERATING SYSTEM

[76] Inventors: Lamar W. Brown, 1185 Clearview Dr., Ringgold, Ga. 30736; James E. Bartenfield, 1104 W. Pine Dr., Dalton, Ga. 30720

[21] Appl. No.: 279,336

[22] Filed: Jul. 1, 1981

[51] Int. Cl.³ .............................. B01F 3/04; B01F 5/06
[52] U.S. Cl. ......................... 252/359 E; 261/DIG. 26; 422/133
[58] Field of Search .............. 252/359 D, 359 E, 307, 252/314; 422/133–135; 366/101, 107, 336, 348, 604; 264/50; 261/DIG. 26

[56] References Cited
U.S. PATENT DOCUMENTS

| | | | |
|---|---|---|---|
| 4,042,217 | 8/1977 | Snider et al. | 261/DIG. 26 |
| 4,070,302 | 1/1978 | Chatterton | 252/359 E |
| 4,133,773 | 1/1979 | Simmons | 252/359 E |
| 4,233,265 | 11/1980 | Gasper | 422/135 |

FOREIGN PATENT DOCUMENTS

| | | | |
|---|---|---|---|
| 11381 | 5/1980 | European Pat. Off. | 422/133 |
| 2060420 | 5/1981 | United Kingdom | 261/DIG. 26 |

Primary Examiner—Bradley Garris
Attorney, Agent, or Firm—Jones & Askew

[57] ABSTRACT

A system for producing foam continuously. A body member defines a foam generating chamber. A foamable liquid is introduced into an inlet of the foam generating chamber. A gas is simultaneously introduced under pressure into the inlet of the foam generating chamber to form a mixture of foamable liquid and gas. The mixture is then flowed from the inlet of the foam generating chamber to an outlet thereof through a turbulator medium which substantially fills the foam generating chamber to thereby foam, mix and homogenize the mixture. The inlet and outlet of the foam generating chamber are in an imaginary substantially non-horizontal plane. The foamed and homogenized mixture is then removed from the outlet.

3 Claims, 4 Drawing Figures

CONTINUOUS FOAM GENERATING SYSTEM

TECHNICAL FIELD

The present invention relates to a system for producing foam; and particularly to such a system for producing foam in a continuous process.

BACKGROUND OF THE INVENTION

Foam has long been recognized as a useful substance, particularly in the textile industry. Foam can be applied to a wide variety of textile materials for a wide variety of purposes. Exemplary of such applications is the application of a layer of foam to the underside of a carpet to provide an integral cushion therewith. Such layers can be relatively thick, as is often desirable in carpet applications, or relatively thin, as in the case of drapery fabrics and shoe insoles. Cushioning type foams can be made of natural rubber latex, synthetic rubber latex, blends thereof as well as a wide variety of other synthetic polymers which are well known in the art.

Foams also find applications in the area of dyeing and treatment of fabrics with resins, such as water repellants, fire retardants, so-called permanent press resins and the like. By replacing a portion of the liquid material with an air bubble to provide a foam, drying or curing time is reduced thereby conserving energy.

Essentially, the only requirement for a material to be foamable is that the material have appropriate surface properties in order to maintain a bubble or cellular structure for the desired period of time. Materials which are not otherwise foamable can usually be rendered foamable by the addition of a surface active agent. Such agents are well known in the art.

As used herein the term "foam" is intended to denote and mean a mixture of liquid and air, the air having been mechanically combined with the liquid as opposed to being chemically generated in situ. The term "froth" is sometimes applied to such mixtures of liquid and air and it is intended that the term foam includes the term froth.

For many applications, it is often desirable to produce foam in a continuous process, rather than in a batch process. Continuous foam homogenizers are well known in the art.

Typically, a continuous foam homogenizer produces foam by combining air with a foamable material and injecting the mixture under pressure into a homogenizing head where it is mixed, foamed and rendered a uniform density by a rotor turning at high speed within a stator. The rotor usually has a plurality of pins extending radially outward and the stator has a plurality of pins extending radially inward to enhance the mixing action of the spinning rotor. An example of such a foam homogenizer is shown in U.S. patent application Ser. No. 244,766 filed Mar. 17, 1981, now abandoned. These types of mechanical foam generators or foam homogenizers utilize a number of moving parts which are subject to wear and mechanical failure. Furthermore, the motor required to operate the homogenizer consumes a substantial amount of energy.

BRIEF DESCRIPTION OF THE INVENTION

The present invention relates to a system for producing foam continuously. A body member defines a foam generating chamber. A frothable liquid is introduced into an inlet which communicates with the foam generating chamber. A gas is simultaneously introduced under pressure into the inlet of the foam generating chamber to form a mixture of frothable liquid and gas. The mixture is then flowed from the inlet of the foam generating chamber to an outlet in communication with the foam generating chamber through a turbulator medium which substantially fills the foam generating chamber to thereby foam the mixture. The inlet and the outlet of the foam generating chamber are in an imaginary plane which is substantially non-horizontal. The foamed mixture is then removed from the outlet.

Accordingly, it is an object of the present invention to provide an improved continuous foam generator.

Another object of the present invention is to provide a continuous foam generator which does not require any moving parts.

A further object of the present invention is to provide a continuous foam generator which has improved energy efficiency.

Yet another object of the present invention is to provide a continuous foam generator which has improved operating reliability.

Still another object of the present invention is to provide a continuous foam generator which produces a homogeneous foam at relatively large rates of production.

These and other objects, features and advantages of the present invention will become apparent after a review of the following detailed description of the disclosed embodiments and the appended drawing and claims.

DETAILED DESCRIPTION OF THE DISCLOSED EMBODIMENT

Figure 4:
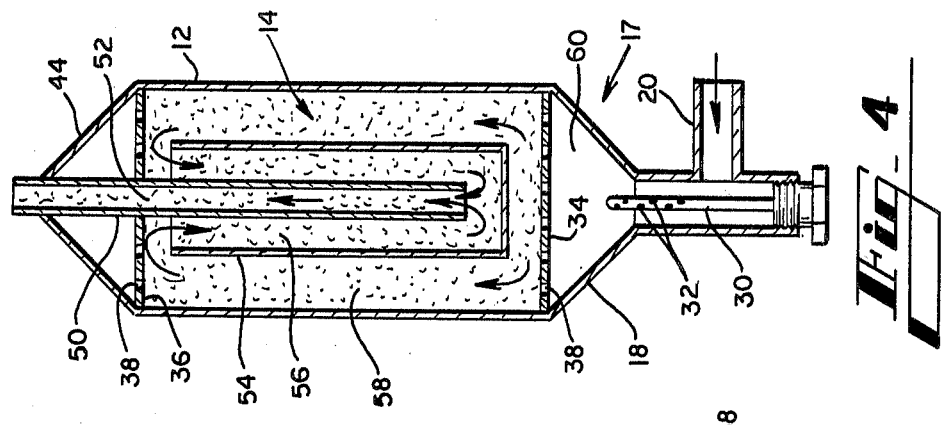
FIG. 4 is a cross-sectional view of an alternate disclosed embodiment of the continuous foam generator of the present invention.

Referring now to the drawing in which like numbers indicate like elements throughout the several views, it will be seen that there is a foam generator 10 comprising an elongate cylindrical pipe 12 which defines a foam generating chamber 14 therein.

Connected by mating threads 16 to the lower end 17 of the pipe 12 is a cap 18. Connected to the cap 18 is a "T" 20. One end of a nipple 22 is connected to one leg of the "T" 20. The other end of the nipple 22 is connected to one end of a flexible hose 24. The other end of the flexible hose 24 is connected to a source or reservoir of foamable liquid (not shown).

Connected to the other leg of the "T" 20 is a nipple 26. One end of the nipple 26 is connected to one end of a flexible air hose 28. The other end of the hose 28 is connected to a source of air under pressure, such as a compressor. Suitable regulating means (not shown) can be provided at the source of the air under pressure so that different desired pressures of air can be supplied to the nipple 26. The other end of the nipple 26 is connected to a length of pipe 30 which projects upwardly into the enclosed region partially defined by the cap 18.

The end of the pipe 30 opposite the nipple 26 is closed, however, holes 32 are provided in a spiral configuration along the side wall of pipe 30. It will thus be appreciated by those skilled in the art that the foamable liquid can be introduced into the foam generating chamber 14 through the hose 24, the nipple 22 and the "T" 20, and that air under pressure can be introduced into the foam generating chamber through the hose 28, the nipple 26, the pipe 30 and the holes 32. When air and foamable liquid are supplied through the hoses 28, 24, it will be appreciated that a non-homogenous mixture of air and foamable liquid will be introduced to the lower end 17 of the foam generating chamber 14.

It should be understood that although the present invention is described as using air, other suitable gases, which are preferably non-reactive with the foamable liquid, can be used.

Figure 3:
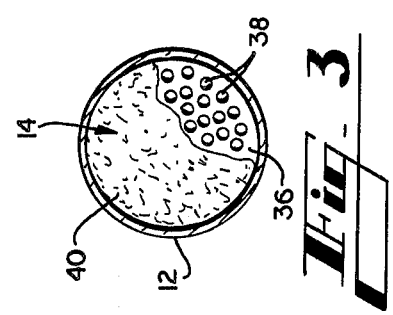
FIG. 3 is a partial cut away cross-sectional view taken along the line 3—3 of the foam generator shown in FIG. 1.
Figure 2:
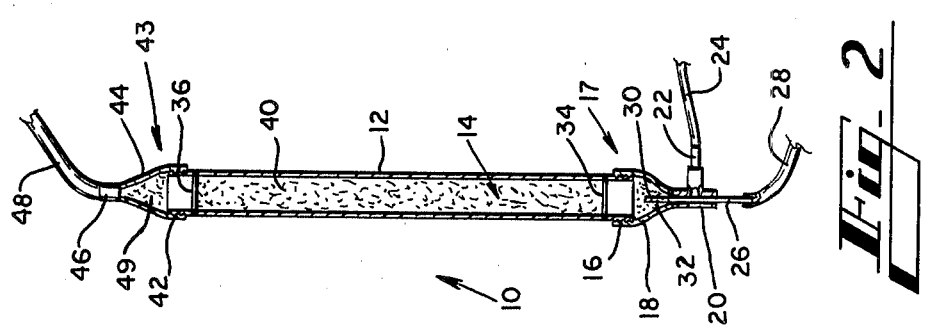
FIG. 2 is a cross-sectional view of the foam generator shown in FIG. 1.
Figure 1:
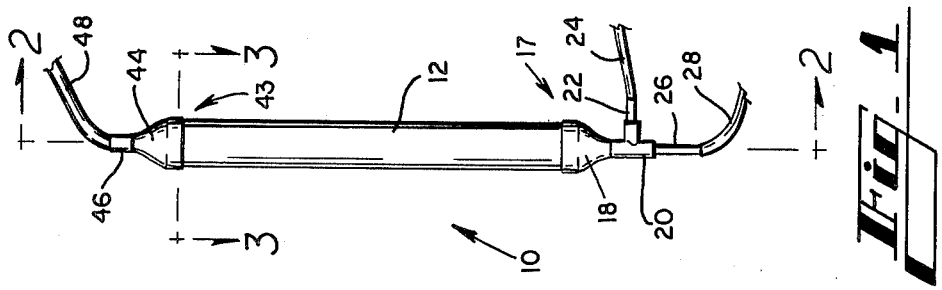
FIG. 1 is a pictorial view of a disclosed embodiment of the continuous foam generator of the present invention.

Attached to the interior walls of the pipe 12 adjacent each end thereof are plates 34, 36 each of which includes a plurality of holes 38 (FIG. 3) extending therethrough. Disposed in the foam generating chamber 14 between the two plates 34, 36 is a turbulator medium 40. The turbulator medium 40 is preferably non-reactive with the foamable liquid/gas mixture. The turbulator medium 40 disturbs the flow of the foamable liquid/gas mixture through the foam generating chamber 14 so sufficient shear forces, mixing and homogenizing takes place as the mixture passes therethrough that a uniform, homogenous foam emerges from the other end of the foam generating chamber. A variety of different materials suitable for use as the turbulator material can be used, such as stainless steel shavings, nylon or other plastic shavings, nylon or other plastic beads, glass beads, stainless steel wire mesh and the like. The coarseness of the turbulator material will govern the coarseness of the foam. The coarser the turbulator material, the coarser the foam; the finer the turbulator material, the finer the foam.

Connected by mating threads 42 to the upper end 43 of the pipe 12 is a cap 44 essentially identical to the cap 18. One end of a nipple 46 is connected to the cap 18 and the other end is connected to one end of a flexible hose 48. The other end of the flexible hose 48 is connected to apparatus (not shown) which will use the foam, such as a foam or dye coating machine.

Contained in the gap 44 is a mass of fine mesh stainless steel 49. This mesh 49 provides a final filter or homogenizing medium for the foam as it leaves the foam generating chamber 14.

Operation of the foam generator 10 will now be considered. A typical foamable liquid, such as one having the following composition, is fed from a reservoir through the hose 24 to the foam generator 10: a styrene-butadiene latex compound containing approximately one part of a sulfosuccinamate soap, such as sodium lauryl sulfate, and suitable quantities of curing agents, fillers, antioxidents, accelerators, stabilizers and the like. The foamable liquid can be pumped through the hose 24 under pressure or can be fed through the hose by gravity feed. The volume of liquid which can be fed through the foam generator depends on several factors such as the diameter of the pipe 12, the type of turbulator medium 40 and the like. However, for a four inch pipe containing very fine stainless steel shavings, the production rate of foam is approximately two to five gallons per minute. Greater production rates can be obtained by using a plurality of foam generators connected together in series or in parallel. Although dimensions of the pipe 12 are not critical to the present invention, and larger and smaller pipes can be used, it is found that pipes having a diameter of between approximately one inch and four inches and having a length between approximately eighteen inches and six feet are practical for use in the present invention.

Air under pressure is fed from an air compressor through the hose 28 to the foam generator 10. In order to obtain suitable production rates, it is desirable to maintain approximately a twenty pound per square inch pressure drop between the inlet of the foam generating chamber 14 and the outlet therefrom and that the pressure of the foam at the outlet be approximately twelve to sixty pounds per square inch. Therefore, the pressure of the air in the hose 28 can be between approximately eight and thirty-two pounds per square inch. Although greater or less air pressures can be used, it is found that the use of lower pressure air at higher flow rates produces better results in the present invention than higher pressures at lower flow rates.

The foamable liquid in the hose 24 flows through the nipple 22, into the "T" 20 where it mixes with air coming from the pipe 30. As the foamable liquid and air mixture flows through the turbulator medium 40 in the foam generating chamber 14, the turbulence and mixing action created thereby causes the air bubbles to be broken down into smaller sized bubbles and the mixing action causes the mixture to assume a homogeneous consistency. When the mixture leaves the foam generating chamber 14 it is a fine, uniform foam. The finished foam flows out of the foam generator 10 through the cap 44, the nipple 46 and the hose 48 to a suitable coating apparatus, dyeing apparatus or the like.

In order for the foam generator of the present invention to operate, it is a critical feature that the pipe 12 be maintained in a substantially non-horizontal orientation. As used herein the term substantially non-horizontal means from approximately 10 degrees plus or minus from horizontal to vertical.

It should also be understood that the present invention will operate whether or not the flow of the liquid/air mixture flows through the foam generating chamber against the pull of gravity or with it, i.e. whether the end 17 is lower than the end 43 or whether the end 17 is higher than the end 43. The critical aspect of the invention is that the pipe 12 cannot be horizontal or plus or minus 10 degrees therefrom.

Referring now to FIG. 4, it will be seen that there is an alternate disclosed embodiment for the foam generating chamber. As shown in FIG. 4 there is provided a foam generating chamber having three zones connected in series. A pipe 50 extends from the outlet of the foam generator, through the foam generating chamber 14, toward the inlet to the foam generator, but terminating short thereof. The pipe 50 which is open at both ends, defines a first zone 52 in the foam generating chamber 14.

Another pipe 54, which is closed at its lower end, is disposed within the pipe 12 and the foam generating chamber 14, but is disposed about the pipe 50. The pipe 54 defines a second zone 56 of the foam generating chamber 14 in the space between the pipe 54 and the pipe 50. The pipe 12 defines a third zone 58 of the foam generating chamber 14 in the space between the pipe 12 and the pipe 54.

It will be appreciated by those skilled in the art that the foamable liquid and air mixture flows from the input of the foam generating chamber 14 upwardly through the third zone 58, then downwardly through the second zone 56 and, finally, upwardly through the first zone 54 to the outlet. The use of a series of zones in the foam generating chamber permits a greater foam production rate without unduely increasing the overall length of the pipe 12.

Defined by the cap 18 and the plate 34 is a premix chamber 60. The spiral configuration of the holes 32 on the pipe 30 causes the air emerging therefrom to produce a swirling or cyclone effect in the liquid/air mixture in the premix chamber 60. This cyclone effect to the premix chamber 60 enhances the foaming and homogenizing of the foam generator.

It should be understood, of course, that the foregoing relates only to a preferred embodiment of the present invention and that numerous modifications or alterations may be made therein without departing from the spirit and scope of the invention as set forth in the appended claims.

What is claimed is:

1. Apparatus for producing foam continuously, said apparatus comprising:
    a body member defining a foam generating chamber, said body member having an inlet in communication with said foam generating chamber and an outlet in communication with said foam generating chamber at a point remote from said inlet, said inlet and outlet being in an imaginary substantially non-horizontal plane;
    means for introducing a foamable liquid into said inlet;
    means for introducing a gas into said inlet simultaneously with said foamable liquid;
    turbulator means substantially filling said foam generating chamber for foaming, mixing and homogenizing said foamable liquid and gas;
    first baffle means disposed within said body member and extending from said outlet toward said inlet, said first baffle means defining a first zone within said foam generating chamber;
    second baffle means disposed within said body member and disposed about said first baffle means, said second baffle means defining a second zone within said foam generating chamber between said first baffle means and said second baffle means;
    said body member defining a third zone within said foam generating chamber between said body member and said second baffle means;
    said third zone communicating with said inlet and with said second zone at one end of said second baffle means; and
    said second zone communicating with said first zone at the other end of said second baffle means, said second zone not being communicable with said third zone at said other end of said second baffle means and said first zone communicating with said outlet.

2. The apparatus of claim 1 wherein said turbulator means comprises stainless steel shavings.

3. The apparatus of claim 1 further comprising a premix chamber disposed between said inlet and said third zone of said foam generating chamber and in communication therewith and means for producing a cyclone effect in a liquid/gas mixture in said premix chamber.

* * * * *